US012781102B2

(12) United States Patent
Klotz et al.

(10) Patent No.: US 12,781,102 B2
(45) Date of Patent: Nov. 3, 2026

(54) MIXTURE COMPRISING AN ADHESIVE AND A WAX-BASED FILLER

(71) Applicant: Henkel AG & Co. KGaA, Duesseldorf (DE)

(72) Inventors: Michael Klotz, Edingen-Neckarhausen (DE); Slawomir Nowicki, Gaiberg (DE); Verena Gerold, Wiesloch (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 672 days.

(21) Appl. No.: 17/676,439

(22) Filed: Feb. 21, 2022

(65) Prior Publication Data

US 2022/0169898 A1 Jun. 2, 2022

Related U.S. Application Data

(63) Continuation of application No. PCT/EP2020/074424, filed on Sep. 2, 2020.

(30) Foreign Application Priority Data

Sep. 5, 2019 (EP) .................................... 19195518

(51) Int. Cl.

*C09J 107/00* (2006.01)
*C08K 3/26* (2006.01)
*C08L 9/00* (2006.01)

(52) U.S. Cl.

CPC ............... *C09J 107/00* (2013.01); *C08K 3/26* (2013.01); *C08L 9/00* (2013.01)

(58) Field of Classification Search

CPC ............. C09J 107/00; C08L 9/00; C08K 3/26
See application file for complete search history.

(56) References Cited

U.S. PATENT DOCUMENTS

| | | | | |
|---|---|---|---|---|
| 9,290,683 | B2 | 3/2016 | Campbell et al. | |
| 2005/0222311 | A1* | 10/2005 | Richter | C08L 23/02 524/275 |
| 2009/0312483 | A1* | 12/2009 | Kitson | C09J 7/22 524/505 |
| 2013/0217804 | A1* | 8/2013 | Campbell | C08G 59/50 523/400 |
| 2016/0244649 | A1* | 8/2016 | Johnson | D06M 13/402 |

FOREIGN PATENT DOCUMENTS

| | | | | |
|---|---|---|---|---|
| CN | 101084286 | A | 12/2007 | |
| EP | 1287885 | A1 | 3/2003 | |
| EP | 2392630 | A1 * | 12/2011 | C02F 1/681 |

OTHER PUBLICATIONS

Xanthos, Marino, Functional Fillers for Plastics—Calcium Carbonate, Wiley-VCH, 2005, Ch 16, pp. 271-284.*
International Search Report for PCT/EP2020/074424 mailed Nov. 2, 2020.

* cited by examiner

*Primary Examiner* — Eli D. Strah
(74) *Attorney, Agent, or Firm* — Mary K. Cameron

(57) ABSTRACT

The present invention relates to a mixture comprising an adhesive and a wax-based filler which is in the form of fibers and/or fiber bundles that form one or more volume structures with one another, to a method for preparing a mixture of this type and to the use thereof in vehicle construction. The present invention further relates to the use of a wax-based filler, in which the wax is present in the form of fibers and/or fiber bundles which form one or more volume structures with one another, as an adsorbent in adhesives.

20 Claims, No Drawings

MIXTURE COMPRISING AN ADHESIVE AND A WAX-BASED FILLER

The present invention relates to a mixture comprising an adhesive and a wax-based filler, i.e. a filler based on wax, which is in the form of fibers and/or fiber bundles that form one or more volume structures with one another, to a method for preparing a mixture of this type and to the use thereof in vehicle construction. The present invention further relates to the use of a wax-based filler, in which the wax is present in the form of fibers and/or fiber bundles which form one or more volume structures with one another, as an adsorbent in adhesives.

Bonding has become a key technology in the automotive industry and is becoming increasingly important. The number of components that are bonded instead of welded together is continuing to increase. By bonding components, it is not only possible to significantly reduce the weight of the vehicle, but there is now also a safety aspect involved, as vehicles comprising mainly bonded components often receive better ratings in crash tests than vehicles that consist mainly of welded components.

In order to meet the different requirements when bonding the different components of a vehicle, a range of optimized adhesives have been developed, for example body adhesives, window adhesives and surface adhesives. All of these adhesives are applied differently and must meet different end requirements so that different types of adhesives are used.

For example, body adhesives are usually applied before the cathodic dip paint and must pass through the paint undamaged and be resistant to the high temperatures when the dip paint is drying. It is just as undesirable for adhesive to flow off as it is to flow out of regions that have already been joined. A high washout resistance is essential, especially since very high forces can occur when nozzles pass through in the immersion process.

In this context, there is a need for adhesives that can be used in body construction and, above all, have high corrosion resistance and moisture resistance and good compatibility with the process oils used in body construction, such as drawing, molding and anti-corrosion oils. It is therefore the object of the present invention to provide an adhesive of this type.

It has surprisingly been found that this object is achieved by a mixture which, in addition to an adhesive, has a filler comprising wax-based adsorbing properties.

A first subject matter of the present invention is therefore a mixture containing an adhesive and a wax-based filler, the wax being in the form of fibers and/or fiber bundles which form one or more volume structures with one another.

The corrosion resistance and moisture resistance of different adhesives can be significantly improved by adding the filler. In addition, it was found that the mixture has good compatibility with the substances commonly used in the automotive industry, so that it can be used in combination with a number of different oils and substrates.

The wax-based filler is in the form of fibers and/or fiber bundles that form one or more volume structures with one another. In the context of the present invention, a volume structure is to be understood as a structure of fibers and/or fiber bundles that is formed by the adhesion of the fibers and/or fiber bundles with one another. This is a three-dimensional, disordered network in which at least 80% of the fibers and/or fiber bundles are arbitrarily intermeshed with one another, and the volume structure can have air inclusions.

The filler used in the mixture according to the invention is preferably an adsorbent, in particular an adsorbent for hydrophobic substances. It has surprisingly been found that the addition of an adsorbent made it possible in particular to improve the corrosion resistance and moisture resistance of the mixture.

The filler used in the mixture according to the invention is a wax-based filler. For the purposes of the present invention, wax is to be understood as meaning organic compounds which are solid at room temperature and form a liquid of low viscosity above their melting point. In the context of the present invention, the wax which forms the basis for the filler is preferably selected from the group consisting of natural and synthetic waxes. In a particularly preferred embodiment, the wax is selected from the group of synthetic waxes, in particular the group consisting of polyethylene wax, polypropylene wax, polyethylene-polypropylene copolymer wax and mixtures thereof. In an alternative preferred embodiment, the wax is selected from the group of natural waxes, in particular from the group consisting of montan wax, carnauba wax, beeswax and candelilla wax.

It was surprisingly found that the adsorption properties of the filler in the mixture according to the invention could be significantly improved if waxes having a certain molecular weight were used, in particular waxes the molecular weight of which was not more than 15,000 g/mol. An embodiment is therefore preferred in which the wax has a number-average molecular weight of less than 15,000 g/mol, particularly preferably 200 to 11,000 g/mol. The molecular weight of the wax can be determined using GPC, for example.

The mixture according to the invention is particularly notable for its high resistance to moisture. Without being bound to a specific theory, it is assumed that this is due in particular to the presence of the filler, which is in the form of a volume structure formed by fibers and/or fiber bundles. It has proven to be particularly advantageous here if fibers which have been produced by means of a melt spinning process are used for the formation of the volume structure. An embodiment of the present invention is therefore preferred in which the fibers which form the volume structure of the filler in the mixture according to the invention are produced by means of a melt spinning process and subsequent atomization.

The filler contained in the mixture according to the invention is in the form of a volume structure which is formed from fibers and/or fiber bundles. There are no special requirements to be placed on the length of the fibers and/or the fiber bundles. Rather, fibers and/or fiber bundles can be used, the length of which varies from a few millimeters to several meters, it being preferred to use fibers and/or fiber bundles of different lengths. Furthermore, it has proven advantageous to use fibers and/or fiber bundles of different diameters, the fibers and/or fiber bundles preferably having a diameter of 20 nm to 5 mm, particularly preferably 50 nm to 2 mm.

In a preferred embodiment, the mixture according to the invention has a content of 0.1 to 30 wt. %, preferably 0.5 to 10 wt. %, of the filler, in each case based on the total weight of the mixture.

In the context of the present invention, it was surprisingly found that a range of different adhesives can be used in the mixture according to the invention. In a preferred embodiment, the adhesive contained in the mixture according to the invention is therefore selected from the group consisting of rubber adhesives, polyurethane adhesives, acrylate adhesives, epoxy adhesives, adhesives based on EVA (ethylene vinyl acetate) polymers and adhesives based on silane-modified polymers.

The mixture according to the invention can contain further components, for example further fillers, such as calcium carbonate, and/or further polymeric additives. In a preferred embodiment, the mixture according to the invention also has a homopolymer based on polyunsaturated $C_4$ to $C_{14}$ alkyl chains. In a particularly preferred embodiment, the mixture according to the invention also contains polybutadiene, preferably in an amount of 5 to 25 wt. %, particularly preferably 10 to 20 wt. %, in each case based on the total weight of the mixture.

The form in which the mixture according to the invention is present can be adapted depending on the field of application. In some applications it may be desirable for the mixture to be in the form of a paste or liquid so that it can be easily applied to a substrate. The mixture according to the invention is therefore preferably in liquid, solid or pasty form.

The mixtures described in the prior art can have the disadvantage, inter alia, that they are only compatible with a limited number of the substances used in the manufacture of automobiles, so that they can only be used to a limited extent. In contrast to this, the mixture according to the invention has good compatibility with common substances used in the automotive industry and can be used in a range of applications, it being possible for further modifications to be made for the relevant application. The mixtures can therefore also be used when the substrate has been treated with oil and/or lubricant or there is oil and/or lubricant on the surface of the substrate, it being possible to select the oil and/or the lubricant from the group consisting of natural and synthetic oils and natural and synthetic lubricants, in particular drawing oils, molding oils, anti-corrosion oils and dry lubricants.

The present invention further relates to a method for preparing the mixture according to the invention. The method according to the invention comprises the steps of providing an adhesive and a wax-based filler, the wax being in the form of fibers and/or fiber bundles that form one or more volume structures with one another, and mixing the adhesive and the filler. Mixing can take place on the basis of the consistency of the adhesive, for example by means of horizontal kneaders or in stirred tanks.

The good compatibility of the mixture according to the invention with other substances allows it to be used in a large number of fields of application. Surprisingly, however, the mixture has proven to be particularly suitable for use in vehicle production. The present invention therefore further relates to the use of the mixture according to the invention in vehicle production. In a preferred embodiment, the mixture according to the invention is used in body construction.

The present invention further relates to the use of a wax-based filler, the wax being in the form of fibers and/or fiber bundles which form one or more volume structures with one another, as an adsorbent for hydrophobic substances in adhesives.

The present invention is to be explained in more detail with reference to the following examples, which are in no way to be understood as a restriction of the inventive concept.

EXAMPLES

A mixture according to the invention was prepared by mixing together solid rubber, polybutadiene, calcium carbonate and a suitable wax-based filler.

Suitable wax-based fillers are described, for example, in the publication EP 2 392 630, to which reference is expressly made here, and are commercially available under the trade name Deurex PURE from Deurex AG, Germany.

Moisture resistance and corrosion resistance were tested under different conditions using the following substrates:

EGS: electrogalvanized steel outer shell (e.g. DX54D+ZE75/75, thickness ≥0.8 mm)

HDG: hot-dip galvanized steel outer shell (e.g. DX54D+Z100, thickness ≥0.8 mm)

ALU: aluminum (e.g. A16-OUT Surfalex, thickness ≥0.8 mm)

The bond between the substrates was tested after the specified time in each case:

++: very good

+: good o: satisfactory

"RH*" in the examples represents Relative Humidity

Edging Fold Adhesives

TABLE 1

| Substrate: EGS/HDG mixed bonding | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | ++ | ++ | ++ | ++ | ++ | ++ | + | + |
| After 15 min at 160° C. | ++ | ++ | ++ | ++ | ++ | ++ | + | + | o | o |
| After CDC furnace (without pre-curing) | ++ | ++ | ++ | ++ | ++ | + | + | o | o | o |

TABLE 2

| Substrate: ALU/ALU | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | ++ | ++ | ++ | ++ | ++ | ++ | + | + |
| After 15 min at 160° C. | ++ | ++ | ++ | ++ | ++ | ++ | ++ | ++ | o | o |
| After CDC furnace (without pre-curing) | ++ | ++ | ++ | ++ | ++ | ++ | + | + | o | o |

Relining Adhesives

TABLE 3

| Substrate: EGS/HDG mixed bonding | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | ++ | ++ | ++ | ++ | ++ | ++ | ++ | ++ |

TABLE 3-continued

| Substrate: EGS/HDG mixed bonding | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| After 15 min at 160° C. | ++ | ++ | ++ | ++ | ++ | ++ | ++ | ++ | ++ | ++ |
| After CDC furnace (without pre-curing) | ++ | ++ | ++ | ++ | ++ | ++ | ++ | ++ | ++ | ++ |

TABLE 4

| Substrate: ALU/ALU | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | ++ | ++ | ++ | ++ | ++ | ++ | ++ | ++ |
| After 15 min at 160° C. | ++ | ++ | ++ | ++ | ++ | ++ | ++ | ++ | ++ | ++ |
| After CDC furnace (without pre-curing) | ++ | ++ | ++ | ++ | ++ | ++ | ++ | ++ | ++ | ++ |

*: relative humidity

As can be seen from the data summarized in tables 1 to 4, the mixture according to the invention has excellent moisture resistance and still displays outstanding composite properties after 5 weeks even under storage conditions of 40° C. and 100% relative humidity.

As a comparison, the results of the same mixture without a wax-based filler are shown below in Tables 5-8:

Edging Fold Adhesives

TABLE 5

| Substrate: EGS/HDG mixed bonding | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | + | ○ | − | − | ++ | + | ○ | − | − |
| After 15 min at 160° C. | ++ | + | ○ | − | − | + | ○ | − | − | − |
| After CDC furnace (without pre-curing) | + | ○ | − | − | − | ○ | − | − | − | − |

TABLE 6

| Substrate: ALU/ALU | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | + | ○ | − | − | ++ | + | ○ | − | − |
| After 15 min at 160° C. | ++ | + | ○ | − | − | + | ○ | − | − | − |
| After CDC furnace (without pre-curing) | + | ○ | − | − | − | ○ | − | − | − | − |

Relining Adhesives

TABLE 7

| Substrate: EGS/HDG mixed bonding | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | + | ○ | − | ++ | + | ○ | ○ | − |
| After 15 min at 160° C. | ++ | + | + | ○ | − | + | ○ | − | − | − |
| After CDC furnace (without pre-curing) | + | + | ○ | − | − | + | ○ | − | − | − |

TABLE 8

| Substrate: ALU/ALU | | | | | | | | | | |
|---|---|---|---|---|---|---|---|---|---|---|
| | Storage condition | | | | | | | | | |
| | 23° C./80% RH* | | | | | 40° C./100% RH* | | | | |
| | Storage duration (week) | | | | | | | | | |
| | 1 | 2 | 3 | 4 | 5 | 1 | 2 | 3 | 4 | 5 |
| Without pre-curing | ++ | ++ | + | ○ | − | ++ | + | ○ | ○ | − |
| After 15 min at 160° C. | ++ | + | + | ○ | − | + | ○ | − | − | − |
| After CDC furnace (without pre-curing) | + | + | ○ | − | − | + | ○ | − | − | − |

As can be seen from the comparison of the data from tables 1 to 4 with those from tables 5 to 8, the mixture according to the invention has a significantly improved moisture resistance.

The invention claimed is:

1. A mixture comprising an adhesive and a wax filler, wherein the adhesive is selected from the group consisting of rubber adhesives, polyurethane adhesives, acrylate adhesives, adhesives based on ethylene vinyl acetate polymers and adhesives based on silane-modified polymers;

the wax filler is comprised of wax having number-average molecular weight of not more than 15,000 g/mol, wherein the wax is present in the form of wax fibers and/or fiber bundles which form one or more volume structures with one another, and the wax filler is an adsorbent of hydrophobic substances;

wherein each of the wax fibers and/or fiber bundles are made solely of wax and have the same physical structure other than having different lengths and different diameters, the diameters being in a range of 20 nm to 5 mm; wherein the wax filler is present in an amount of 0.1 to 30 wt. %, based on total weight of the mixture; and the mixture further comprises a polymeric additive selected from homopolymers based on polyunsaturated $C_4$ to $C_{14}$ alkyl chains present in an amount of 5 to 25 wt. %, based on total weight of the mixture.

2. The mixture according to claim 1, wherein the wax filler is a filler for hydrophobic substances.

3. The mixture according to claim 1, wherein the wax is selected from the group consisting of natural and synthetic waxes.

4. The mixture according to claim 3, wherein the wax is selected from the group consisting of polyethylene wax, polypropylene wax, polyethylene-polypropylene copolymer wax and mixtures thereof.

5. The mixture according to claim 3, wherein the wax is selected from the group consisting of montan wax, carnauba wax, beeswax and candelilla wax.

6. The mixture according to claim 1, wherein the wax has a number-average molecular weight in a range of 200 to 11,000 g/mol, determined by means of GPC.

7. The mixture according to claim 1, wherein the fibers are produced by means of a melt spinning process and subsequent atomization.

8. The mixture according to claim 1, wherein the filler is polyethylene wax fiber present in an amount of 0.1 to 30-0.5 to 10 wt. %, in each case based on total weight of the mixture.

9. The mixture according to claim 1, wherein the adhesive is selected from the group consisting of rubber adhesives, polyurethane adhesives, acrylate adhesives, and adhesives based on EVA (ethylene vinyl acetate) polymers.

10. The mixture according to claim 1, wherein the one or more volume structures are three-dimensional disordered networks in which at least 80% of the fibers and/or fiber bundles are arbitrarily intermeshed with one another.

11. The mixture according to claim 1, wherein the adhesive includes a solid rubber.

12. The mixture according to claim 11, wherein the polymeric additive is present in an amount of 10 to 20 wt. %.

13. The mixture according to claim 12, further comprising an additional filler.

14. The mixture according to claim 13, wherein the polymeric additive includes polybutadiene.

15. The mixture according to claim 14, wherein the additional filler includes calcium carbonate.

16. A method for preparing a mixture according to claim 1, comprising steps of: providing the adhesive; providing the wax filler, wherein the wax is in the form of fibers and/or fiber bundles that form one or more volume structures with one another; and mixing the adhesive and the filler.

17. A one-part, curable storage stable adhesive composition comprising a solid rubber adhesive, an adsorbent for hydrophobic substances capable of adsorbing oil and/or lubricant present on to-be-bonded surfaces into the adhesive composition; a calcium carbonate filler, and a polymeric additive comprising polybutadiene that is different from the solid rubber adhesive, wherein the adsorbent is comprised of a wax filler, the wax being in the form of wax fibers and/or wax fiber bundles made solely of wax, which form one or more volume structures with one another; wherein the adhesive composition exhibits improved moisture resistance and bonding compared to a like adhesive composition without the adsorbent.

18. An adhesive composition comprising:

an adhesive;

a wax containing filler present in an amount of 0.1 to 30 wt. %, the filler including wax fibers and/or wax fiber bundles made solely of wax;

a further filler; and a polymeric additive present in an amount of 5 to 25 wt. % and different from the adhesive;

wherein the adhesive includes a polyurethane adhesive or an acrylate adhesive, and can also include a rubber adhesive, a solid rubber, or adhesives based on ethylene vinyl acetate polymers; and the polymeric additive includes polybutadiene.

19. The adhesive composition of claim 18, wherein the wax containing filler is an adsorbent of hydrophobic substances such that the hydrophobic substances are adsorbed into the adhesive composition thereby increasing moisture resistance, the wax having number-average molecular weight of not more than 15,000 g/mol, wherein each of the wax fibers and/or fiber bundles have diameters in a range of 20 nm to 5 mm.

20. A one-part curable adhesive composition comprising:

a solid rubber;

a wax containing filler present in an amount of 0.1 to 30 wt. %, the filler comprised of wax fibers and/or wax fiber bundles made solely of wax;

a calcium carbonate filler; and polybutadiene present in an amount of 5 to 25 wt. %;

wherein the wax containing filler is an adsorbent for hydrophobic substances that is capable of adsorbing oil and/or lubricant present on to-be-bonded substrates into the adhesive composition; wherein the wax fibers and/or wax fiber bundles form one or more volume structures with one another; and the adhesive composition exhibits improved moisture resistance and bonding compared to a like adhesive composition in the absence of the wax containing filler.

* * * * *